United States Patent
Simula et al.

(10) Patent No.: US 10,866,318 B2
(45) Date of Patent: Dec. 15, 2020

(54) REMOTE SCANNING AND DETECTION APPARATUS AND METHOD

(71) Applicant: GSE TECHNOLOGIES, LLC, Houghton, MI (US)

(72) Inventors: Glen Raymond Simula, Hancock, MI (US); Gary Bryan Howard, Smithfield, MI (US)

(73) Assignee: GSE TECHNOLOGIES, LLC, Houghton, MI (US)

( * ) Notice: Subject to any disclaimer, the term of this patent is extended or adjusted under 35 U.S.C. 154(b) by 0 days.

(21) Appl. No.: 16/157,918

(22) Filed: Oct. 11, 2018

(65) Prior Publication Data

US 2019/0049574 A1 Feb. 14, 2019

Related U.S. Application Data

(63) Continuation-in-part of application No. 15/196,826, filed on Jun. 29, 2016, which is a continuation-in-part
(Continued)

(51) Int. Cl.
| | |
|---|---|
| *G01S 13/88* | (2006.01) |
| *B60R 11/04* | (2006.01) |
| *G08G 1/01* | (2006.01) |
| *B64C 39/02* | (2006.01) |
| *B60R 1/00* | (2006.01) |

(Continued)

(52) U.S. Cl.
CPC .............. *G01S 13/885* (2013.01); *B60R 1/00* (2013.01); *B60R 11/04* (2013.01); *B64C 39/024* (2013.01); *G01N 21/9515* (2013.01); *G01S 13/86* (2013.01); *G01S 19/48* (2013.01); *G06K 9/00791* (2013.01); *G08G 1/0112* (2013.01); *G08G 1/0125* (2013.01); *G08G 1/0129* (2013.01); *G08G 1/0141* (2013.01); *G08G 1/04* (2013.01); *B60R 2011/004* (2013.01); *B60R 2300/301* (2013.01); *B60R 2300/302* (2013.01); *B60R 2300/8086* (2013.01);
(Continued)

(58) Field of Classification Search
CPC .... H04N 5/332; H04N 5/2253; G02S 13/885; G01S 19/13; G01S 17/08; B60R 11/04; G06T 2207/30184; G06T 2207/10016; G06T 2207/10048
USPC ......................................................... 348/128
See application file for complete search history.

(56) References Cited

U.S. PATENT DOCUMENTS

| | | | | |
|---|---|---|---|---|
| 4,887,463 A * | 12/1989 | Wood | ................. | B60G 17/0275 73/146 |
| 5,417,305 A * | 5/1995 | Parker | ................... | B62K 21/02 180/219 |

(Continued)

*Primary Examiner* — Hee-Yong Kim
(74) *Attorney, Agent, or Firm* — Brooks Kushman P.C.

(57) ABSTRACT

A platform-based observation system that is in communication with a substrate. The system is configured to identify a condition in, on, or within the substrate. The system has components selected from the group consisting of: inputs, processing, and outputs. The inputs may include a visual scanning sensor, an infrared scanning sensor, at least one GPS receiver, and a means for image collection. Processing includes the processing of measurements and image collection data to define conditions and organizing them according to file formatting associated with geographic systems. The outputs include recording the conditions and outputting the conditions on a monitor.

46 Claims, 5 Drawing Sheets

Related U.S. Application Data of application No. 14/708,428, filed on May 11, 2015, now Pat. No. 10,104,344.

(60) Provisional application No. 61/992,472, filed on May 13, 2014.

(51) Int. Cl.
| | |
|---|---|
| *G01N 21/95* | (2006.01) |
| *G01S 19/48* | (2010.01) |
| *G08G 1/04* | (2006.01) |
| *G01S 13/86* | (2006.01) |
| *G06K 9/00* | (2006.01) |
| G05D 1/02 | (2020.01) |
| B60R 11/00 | (2006.01) |

(52) U.S. Cl.
CPC .. *B64C 2201/145* (2013.01); *B64C 2201/148* (2013.01); *G05D 1/0221* (2013.01)

(56) References Cited

U.S. PATENT DOCUMENTS

| | | | | |
|---|---|---|---|---|
| 5,602,543 | A | * | 2/1997 | Prata .................. G01J 5/60 250/338.5 |
| 2013/0127980 | A1 | * | 5/2013 | Haddick ............... G06F 3/013 348/14.08 |
| 2013/0216089 | A1 | * | 8/2013 | Chen .................. G06T 7/0002 382/100 |
| 2016/0148363 | A1 | * | 5/2016 | Phan ................. G06K 9/00664 348/142 |

* cited by examiner

REMOTE SCANNING AND DETECTION APPARATUS AND METHOD

CROSS-REFERENCE TO RELATED APPLICATIONS

This application is a continuation-in-part of U.S. patent application Ser. No. 15/196,826, filed Jun. 29, 2016, now U.S. Pat. No. 10,576,907 issued Mar. 3, 2020, which is a continuation-in-part of U.S. patent application Ser. No. 14/708,428, filed May 11, 2015 now U.S. Pat. No. 10,104,344 issued Oct. 16, 2018, which claims the benefit of U.S. provisional patent application Ser. No. 61/992,472 filed May 13, 2014, each of which are incorporated herein by reference in their entireties.

BACKGROUND OF THE INVENTION (1) Field of the Invention

Disclosed herein are an apparatus and method for accurate infrared and visible spectrum scanning of a structure, such as an underlying terrain, detecting defects and integrating high speed acquisition and data processing of defects in for example roadway and bridge subsurface and surface defects at normal highway speeds.

(2) Description of Related Art

Various methods of infrastructure inspection and assessment (e.g. potholes) have been developed. If such inspection results are not displayed or accessible to operators of the vehicle, travelers are unaware of misdetection and upcoming issues.

BRIEF SUMMARY OF THE INVENTION

An observation system is in communication with a substrate. The system is configured to identify a condition in, on, or within the substrate. The system has components selected from the group consisting of: inputs, processing, and outputs. The inputs may include a visual scanning sensor, an infrared scanning sensor, at least one GPS receiver, a GPR device and a means for image collection. Processing includes the processing of measurements and image collection data to define conditions and organizing them according to file formatting associated with geographic systems. The outputs include recording the conditions and outputting the conditions on a display such as a monitor.

DETAILED DESCRIPTION OF THE INVENTION

Figure 1:
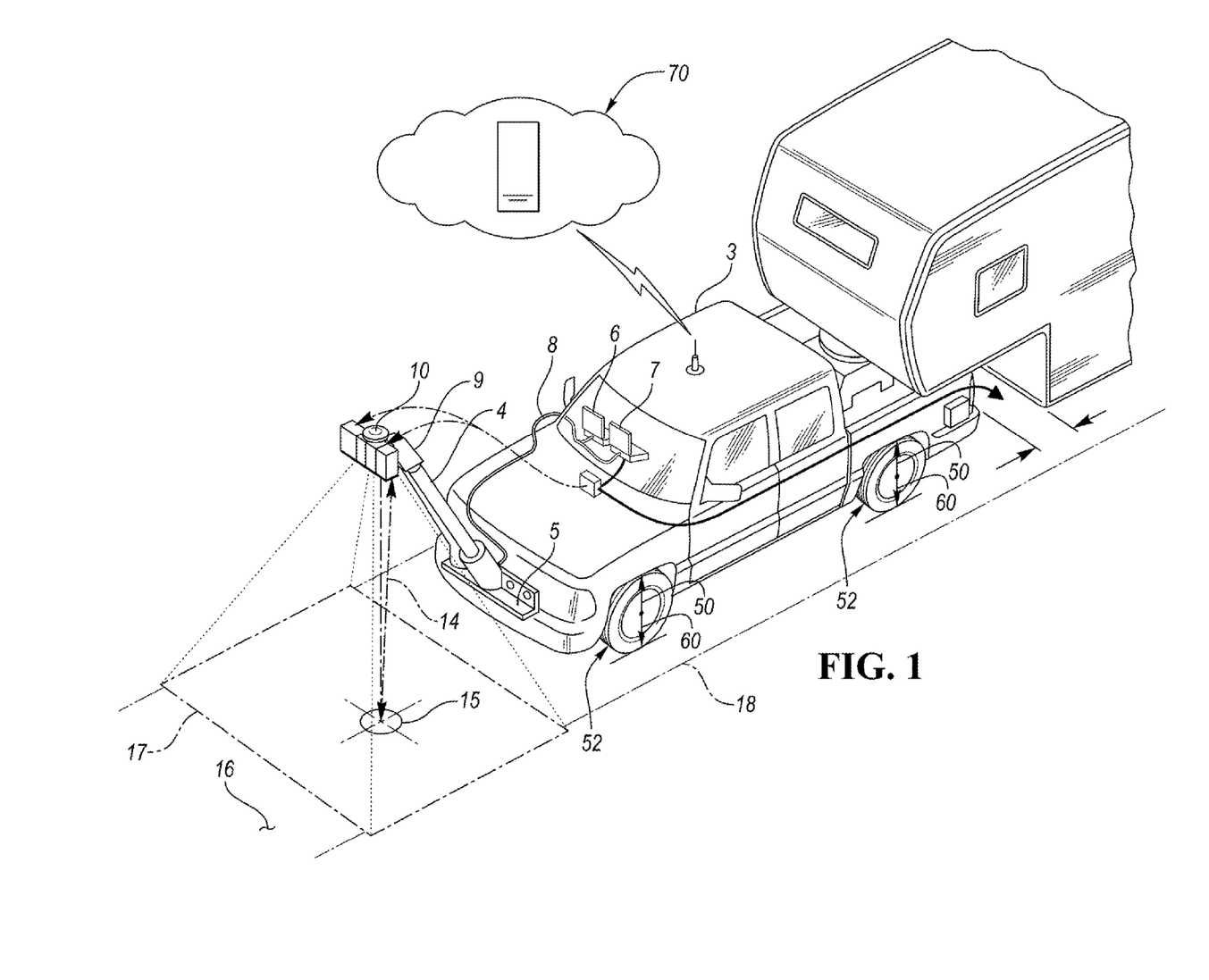
FIG. 1 is a quartering front perspective view of a scanning and scoping apparatus and system embodying several features of the present invention.
Figure 2:
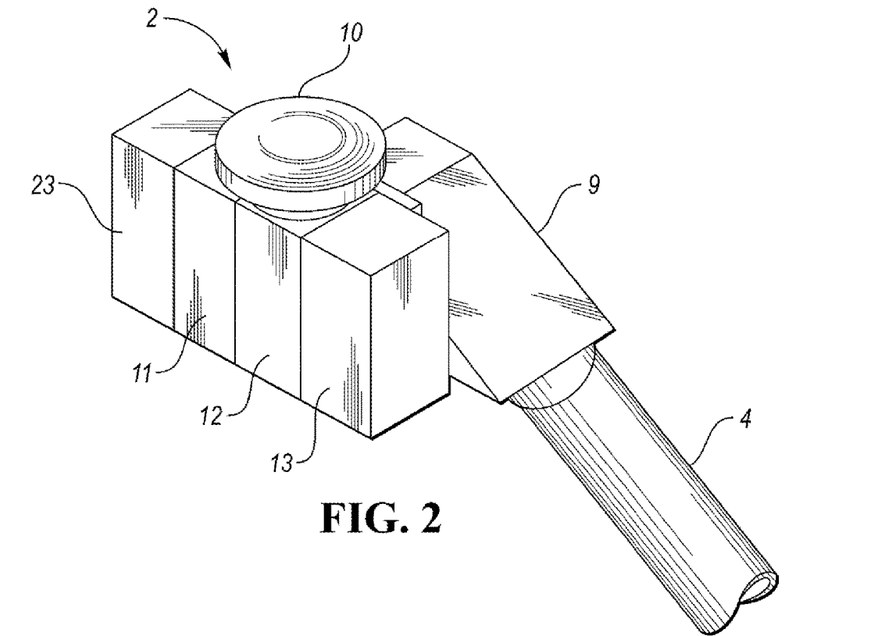
FIG. 2 is an enlarged quartering perspective view of one embodiment of the scanning and scoping head assembly.

FIGS. 1-2 depict a scanning and scoping apparatus and system embodying some features of the present disclosure. In one embodiment, a scanning and scoping sensor head assembly 2 are adaptably mounted to an inspection vehicle 3 by (in some embodiments) a structural boom assembly 4. It should be appreciated that the vehicle 3 may be any type of mobile inspection platform. The vehicle 3 may be human-operated, autonomous, or remote controlled. The vehicle 3 may be moved by any type of propellant or motive force, including a combustion engine, an electric machine, a turbine, a magnet, or otherwise. The inspection vehicle 3 may be a drone or a helicopter having one or more blades. The vehicle 3 may be an airplane or otherwise include an airfoil. As such, the vehicle 3 may form an observational platform for information to be gathered, recorded, or distributed. The vehicle 3 may or may not include a boom assembly 4. All such sensors and instruments may be arranged or disposed about, on, or in the platform system of the vehicle 3.

When used, the boom assembly 4 is attached to and is preferably forwardly-mounted on the vehicle 4 by attachable brackets 5. The scanning and scoping sensors are directed towards a surface to be evaluated, such as a roadway or bridge deck surface 16 to be scanned and scoped to prevent skewing of the edges of the frames as the vehicle 4 is driven while it travels forwardly, if desired, at nominal highway speeds thereabove, recording electronic signal data from the sensors.

Figure 3:
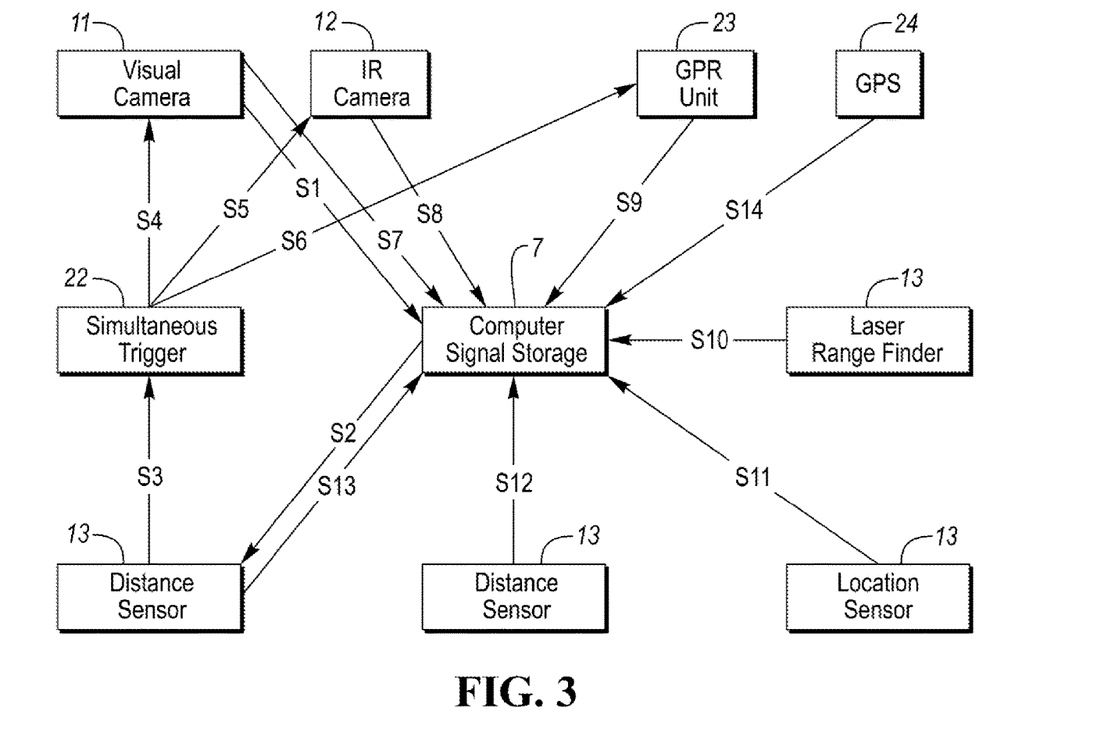
FIG. 3 is a diagram of the main components of an embodiment and their interactions.

FIGS. 2-3 are respectively quartering perspective views of one embodiment of the disclosed scanning and scoping head assembly 2 and a system interaction diagram. They depict one way to arrange several types of sensors that are selected from this group:

a. a high-definition visual band camera 11 for capturing images of the surface to be evaluated, b. a high-definition infrared camera 12 for sub-surface observation, c. a laser range finder 13 for accurately measuring the actual working height, elevation, or separation distance between the scanning and scoping head assembly from the roadway or bridge deck or other surface to be scanned, d. a ground penetrating radar (GPR) unit 23 for capturing further images of the subsurface terrain in addition to those taken by the IR camera 12, e. a global positioning system (GPS) antenna 10 preferably mounted at the upper portion of the scanning and scoping head assembly. The GPS locates the scanning and scoping head assembly as it remains either stationary or travels with respect to latitude, longitude and elevation (three dimensional coordinates) within GPS measurement networks and geographic information systems (GIS), and f. a distance sensor 13 that detects the distance traveled by the sensor head assembly 2 from a point of origin.

The disclosed apparatus and method enable accurate and repeatable infrared and visible spectrum scanning. This allows surface and sub-surface conditions to be sensed and reported to an on-board processor. Information about for example roadway and bridge deck sub-structures and surface defects can be integrated and processed while an inspection vehicle moves at normal highway speeds. Linked to or embedded within the processor is preferably a standardized and accepted DOT output analysis and method for reporting the results. More particularly, the present invention provides for a variety of generally self-contained system apparatus configurations.

The system of the disclosure accurately, quickly, and reliably locates, identifies and quantifies the structural conditions and integrity of the structural materials underlying the surfaces and sub-surface structures being scanned.

In the embodiment of FIG. 2, a representative arrangement is shown of the structural boom assembly 4 that is preferably attached to the forward end of a vehicle 3 to mechanically support the sensor head assembly 2 above the surface 16 to be scanned. It is however understood that the boom assembly 4 (if present) may optionally be adapted and attached to the rear portion of the vehicle 3. Alternatively, the boom assembly can be attached to either the left or right-side portions of the vehicle 3 as may be preferred. Similarly, the sensor head assembly 2 can be mounted at alternate locations with respect to the vehicle 3, the desired direction of travel of the vehicle 3, or area to be scanned.

Bracket assembly 9 adapts and rigidly mounts the sensor head assembly 2 to the boom assembly 4. When not in use, the scanning and scoping sensor head assembly 2, boom assembly 4, bracket assembly 9, attachable brackets 5 and electronic signal cable 8 may be readily detached and otherwise disassembled from the vehicle 3 to allow normal operational use and utility of the vehicle 3 as desired.

The scanning and scoping sensor head assembly 2, for example, has three scanning and scoping sensors 11, 12, and 13. Scanning sensor 11 comprises a visual band high definition video camera. The camera is oriented generally vertically and receives visible band video images of the surface to be scanned 16 at scanned area 17. During this operation, the highway vehicle 3 may remain stationary or be driven forwardly.

Scanning sensor 12 typically is a high-definition infrared camera that is oriented vertically. It receives infrared video images of and below the surface to be scanned 16 over a scanned area 17 as the highway vehicle 3 remains stationary or is propelled forwardly.

A distance measuring sensor or distance sensors 13 may, for example, include a laser range finder, a sonic distance measuring sensor, or other similar sensors having non-contact distance measuring capability. Distance measuring sensor 13 is disposed generally adjacent to both the visible band camera 11 and infrared camera 12 and is preferably calibrated to match the elevation of both the visible band camera 11 and the infrared camera 12.

The distance measuring sensor 13 emits, for example in the case of a laser range finder a laser beam 14 onto the surface being scanned 17 at a target area 15. Laser beam 14 is then reflected back to the sensing portion of laser range finder 13. The received signal is then processed electronically to provide an accurate real-time elevation distance, height measurement, or separation distance of the sensor head assembly 2 above the surface 16 to be scanned and scoped or the sensors' distance from a point of origin.

Turning now to FIG. 3, in one embodiment, the visual camera 11 generates and delivers a signal S1 to a computer processor 7 for analysis, storage, and later retrieval. The processor 7 generates a signal S2 which is communicated to one of the distance sensors 13. That sensor 13 delivers a signal S3 to a simultaneous triggering mechanism 22. That mechanism 22 communicates a signal S4 to the visual camera 11 which causes an image of the surface of underlying terrain to be captured. Simultaneously, the trigger 22 sends a signal S5 to the infrared camera 12. As a consequence, the IR camera 12 causes an image of the sub-surface conditions to be captured. That image is then communicated via signal S8 to the processor 7.

At the same time, the simultaneous trigger 22 also emits a signal S6 to the ground penetrating radar (GPR) unit 23. The GPR unit 23 captures further images of the subsurface terrain in addition to those taken by the IR camera 12 and also sends these images to the processor 7 via signals S9. In the meantime, the laser range finder 13 delivers elevation information via signal S10 to the processor 7. The one or more sensors 13 send signals (S11, S12 and S13) to the processor that characterize distance traveled by the assembly.

Thus, there is created in the processor 7 a record, including the fields of information, perhaps in tabular form, which can later be reported, retrieved, and analyzed.

The GPS sensor antenna 10 is mounted preferably at the uppermost portion of the sensor head assembly 2. In this way, it may clearly receive signals from GPS satellites and other similar position tracking systems. Electronic output signals S14 generated by the GPS sensor antenna 10 are transmitted to the same computer processor 7 or a different computer processor 6 by electrical sensor and control wiring cable 8.

Optionally, each in the suite of sensors would have 6° of freedom—XYZ plus roll, pitch and yaw. Corrections to the sensors can be made real time or after the results are reported. The sensor suite generates two or more data streams—one from the GPR and one from the IR sensor.

The GPR effectively defines the subsurface contours of a pothole/cavity/inclusion ("slices"). Signals from an IR sensor can define the defect's superficial footprint or perimeter. Together, IR & GPR characterize the density, dimensions, volume and shape of the defect field under observation. With mathematical modelling, from a density reading or calculation, the field can be characterized by its precise location and as a void or inclusion (e.g., a rock, granite, asphalt or concrete) of some kind.

Data fusion and analysis of signals from these sensors enable the observer to quantitatively determine for example how much filler material or concrete is needed to repair a defect.

Preferably, the sensors' field of view extends over the entire width of a road. The sweep of one or each member of the sensor suite could be controlled manually or automatically.

Under the disclosed techniques, there is no need for the vehicle to proceed at a constant speed. Observations can be made in a slow or stop-and-go condition. The slower the vehicle, the finer is the resolution.

The system may be useful in detailing anomalies and identifying inclusions or voids based on density calculations. One example is a reinforcing bar ("Rebar") or cable, perhaps under tension. Rebar, also known as reinforcing steel is a steel bar or mesh of steel wires used as a tension device in reinforced concrete and reinforced masonry structures to strengthen and hold the concrete during tension loads. Rebar can rust and become separated from (cracked) concrete. If there is no contact, the Rebar is unable to support the concrete effectively. If there is corrosion, the metal cable may bind to a tube in which it is encased. The rod may no longer be able to be in tension along its entire length. Adjustment may be needed. This condition may be indicated by the system.

Additional features can be observed: a crown, super elevation, expansion joints, a curb and several kinds of defects: cracks—XYZ; potholes—visual & infrared plus GPR; tenting—buckles at expansion joints; rutting—where the asphalt is deformed.

To provide relevant characterizing information, extending from a moving platform (e.g., a ground-based vehicle 3) is a mounting means such as a boom 4 with a proximal end attached 5 to a moving platform (ground-based or an unmanned aeronautical vehicle—drone) and a distal end 9 that supports a suite of sensors. A controlled positioning system may be used to guide the boom's distal end 9 in the XYZ planes (left-right, in-out & vertical). In some embodiments, wireless communication is contemplated between the sensors and an onboard computer processor.

The boom 4 may extend from one or more of the vehicle's front, sides or the rear. The boom need not necessarily be at the same distance from the surface or angle during observation. One embodiment contemplates two lateral booms, each on a different side or end of the vehicle, with or without a longitudinal boom extending forwardly from the vehicle's leading edge. The lateral booms allow the pavement to be scanned simultaneously or independently on opposite sides of the vehicle. In some embodiments the boom 4 may be quite short (e.g., where the inspection vehicle 3 is a drone) and effectively act as a mounting plate.

In another embodiment, on a given side of the vehicle, the boom is lifted so that its distal end overlies terrain on the far side of a barricade. Underlying pavement can then be scoped by two sensors supported by one or two booms on opposite sides of a barricade, while the vehicle moves, providing no posts, telephone, or light poles intervene. In that case, the vehicle is stopped and the boom(s) is retracted. After sensing, the vehicle advances and the boom(s) re-extended.

Under the influence of an actuator(s), one GPS positioning device 24 (FIG. 3) moves the distal end of the boom in response to signals that characterize the terrain ahead (pitch changes). This device 24 also provides an automatic adjustment via signal S14 of the beams generated by devices in the sensor suite at the distal end of the beam so that they impinge upon the surface below at a 90 degree angle ("perpendicularity feature"). Perpendicularity (90°) of the incident sensing beams to the surface being assessed contributes to the accuracy of information provided. In contrast, several prior art approaches project forwardly. This perpendicularity feature is effective, regardless of the underlying surface or slope of the road ahead. For instance, the beam angle in relation to the boom to achieve perpendicularity is different when the vehicle moves on a non-flat surface uphill, over a crest, or downhill. Similarly for a drone's climb, descent or straight and level flight. To maintain perpendicularity, adjustments may also be made if the ground-based vehicle journeys along a path that is banked.

As a result, crisp images are created. There is no fading at the edges of the images, nor is there any blurring at the edges.

GPR systems 23 work when the surface to be observed is wet and perhaps underwater. GPR uses radar that penetrates below the surface, in-depth—rather than being limited to superficial observations. And it provides the opportunity to generate sharply defined images. It may be slower than infrared sensors and thus require the vehicle to move more slowly.

IR and GPR data can usefully be overlaid. High resolution is provided which is better than is available from either individually. Optionally, an operator can superimpose the sensors simultaneously.

In brief, several embodiments offer the following capabilities:

A. Calculating the volume of the defect (see above)

B. Automatic painting (marking) of the defects. Precise location information is tracked by the GPS sensor antenna 24 and stored. Optionally, heads for delivering a paint spray are controlled by a processor 7 that communicates with the GPS sensor antenna 24. As a vehicle drives along it can mark the defective areas. This dispenses with the need to mark manually.

C. Translating into multiple software suites. Various municipalities have different software programs that ideally conform with federally-mandated protocols. As an operational interface, the system can generate outputs in formats that are compatible with the locally adopted software.

D. Inputting data into crack propagation or life prediction estimates. Consider a railroad bridge with holes in it. They may be small. Should they be patched now or not? If not now, when? If small, they may not be a problem. A flaw size is measured and stored as of a given point in time.

E. Comparing previous scans to determine defect growth & growth rates. Consider a situation in which the crack propagates, resulting in a bigger flaw. The situation is observed again in a couple of years. A comparison is made with the earlier observation. A model calculates the rate of propagation and reports the results. An informed decision can then be made on whether the situation justifies the repair cost.

F. Inputting data into structural integrity evaluations. Consider a bridge supported by metal beams between which lie expansion joints. The system allows observations to be made and recorded about structural integrity (load concentration and distribution) around the expansion joints.

G. Providing a visual camera 11 yields additional information about X, Y & Z locations. Snapshots (digital images) can be taken for reference and stored about surrounding environmental conditions.

H. Scanning concrete or asphalt overlays. The system can scan balconies, balustrades, walls, concrete floors of commercial buildings or parking decks for example. The surface under observation need not be horizontal.

Optional features include:

3-D System GPR. Instead of a single GPR sensor 23, an optional array of antennas is contemplated. Such sensors may be installed on a planar base, yet each could be oriented forwardly, rearwardly, or to one side or the other. Such features would then enable defects to be detected that underlie an optically opaque medium, such as Rebar. Images from multiple sensors could then be stitched together in such a way as to provide images that portray the situation in three dimensions. This enables defect volumes to be calculated and be more accurately characterized.

One representative sensor supplier is 3D-Radar, part of the Chemring Group (see, www.3d-radar.com). It is expected that at any given vehicle speed, the resolution of such images is improved as compared to the resolution generated by a single sensor mounted on a vehicle driving at the same speed.

Data from an array of sensors can be fed into crack propagation models. Such approaches enable defects to be characterized (e.g. by location, size, etc.) and defined, for example, if they underlie Rebar and so previously could not have been readily detected.

Higher Speeds. By positioning for example an IR camera 12 on the boom 4 or located at the front of a vehicle and a GPR sensor 23 at its rear, enhanced image resolution is possible, even when the vehicle travels at faster speeds. At such speeds, partial images are generated that are then stitched together to develop a complete frame in the X, Y, and Z directions.

Preferably, such images can be generated a vehicle speeds greater than 45 miles an hour. Such results would not have been possible using a single GPR scanner 23. To accomplish this, the IR and GPR 12, 23 scanners preferably emit different wavelengths. For example, the IR scanner might generate a wavelength of between about 5 and 12μ, whereas the GPR radar sensor might emit energy in the range of about 3 to 5μ.

Generally, IR techniques are suited for identifying delaminations in the top layer of concrete decking (depths of 4"-6") or below the top reinforcing bar layer. GPR techniques can identify the depth of the delamination.

Overall, the disclosed systems and methods (FIGS. 1-3) combine several optional features that characterize the sub-surface defect. Those features include:

1. IR thermography;
2. GPR array 23 at different angles between, for example, +45, 0, −45 degrees or other angles;
3. Triggering device 22 for simultaneous data collection of sensors;
4. Vehicle location or distance sensor 13;
5. Distance measurement sensor 13;
6. Computer processor 7 for data acquisition, data fusion, and reporting; and
7. Vehicle mounted spray apparatus for marking defects on the pavement.

The IR sensor 12 determines deterioration locations combined with a 3-D GPR 23 to identify the three-dimensional characteristics of the defect. This data fusion provides a model of the void including volumes, even beneath a strong reflecting material such as a steel reinforcing bar. Typical conventional vertical GPR arrangements cannot provide data beneath such barriers.

For example, the disclosed methodology enables the scanning and scoping of airport runways and taxiways. Applications extend to infrastructure analysis within other facets of the aviation industry including, for example, commercial, private, and military airports and facilities and to virtually any type of transportation surface and/or infrastructure.

Embodiments of the disclosed system include selected and pre-designed components. Once configured and assembled they may be offered as prepackaged sensor suite with installation kits that are readily adaptable to commercially available highway vehicles for inspection and evaluation of roadways, bridge decks, sub-surface, surface defects, and related transportation infrastructures. Optionally the disclosed methodology may be used in combination with preferably standardized and adopted federal and state Departments of Transportation (DOT) systems for output analysis and reporting of the results.

The disclosed system provides significantly improved accuracy, rapid on-site integration, and rapid processing of the recorded scan data and high-definition visible band imagery. It provides an observer with the ability to identify material defects in concrete roadways and bridge decks whereby the presence of areas of delamination, previous patch repairs, spalling, and other defects are readily identified by means of infrared camera data.

Further, the operator is given the ability to quickly identify and reconcile defects and anomalies presented by the infrared camera data with the high-definition visible band imagery. Once the reconciliatory steps are complete, software may be utilized to provide accurate correlation and orientation of the recorded data with respect to global positioning system (GPS) coordinates.

The present disclosure is therefore adapted to provide output reporting including correlation with geographic information systems (GIS) as well as KML file formats associated with GIS service providers such as, and not limited to for example, United States Geological Survey (USGS), or Google Earth, thus providing accurate reference to these types of 3-dimensional databases.

The disclosed system and method accurately and quickly identify and quantify various types of structural defects within roadway and bridge deck surfacing materials such as concrete and asphalt while the vehicular observation platform moves at normal and nominal traffic highway speeds.

In a nutshell, disclosed herein is a surface scanning apparatus that is supported by for example a commercially available highway vehicle, mobile equipment, or the like. The apparatus can be moved along and be readily operated upon exiting roadways and bridges. It includes at least one member of a suite of sensors that make up a variously adaptable, complete, and ready to operate packaged kit.

As mentioned earlier, the surface scanning apparatus can be operated at nominal highway speeds and preferably at a general magnitude of travel velocity in the range of 50 miles per hour (80 kilometers per hour). In this way, roadway lane and bridge closures, the re-routing of traffic onto alternate routes, the slowing of normal vehicle traffic, or otherwise significant interruptions to the normal and safe flow of traffic and vehicles are at least partially or entirely eliminated.

In one exemplary embodiment, the surface scanning apparatus system and kit has a vehicle-mounted high-definition visible band camera 11; a vehicle mounted high-definition infrared band camera 12; a structural boom assembly 4 attached to the highway vehicle 3 so that the high-definition visible and infrared cameras are remotely mounted at a desired elevation above the surface to be scanned to achieve a desired field of view (FOV); and a GPS antenna 24 mounted alongside or thereabove. The field of view (FOV) to be scanned may be selected and preferably for example be approximately at least one traffic lane in width or more as a portion of the roadway or bridge deck surface.

Preferably, the structural boom assembly 4 also supports an electronic laser range finder 13 for accurately measuring the separation distance of the vehicle-mounted high-definition visible and infrared band cameras. The electronic laser range finder provides an accurate reference signal for calibration and correction factors related to the separation distance and data signals received by the vehicle-mounted high-definition visible and infrared band cameras.

As mentioned, there are one or more GPS antennas 24 for real-time recording of vehicle position, speed, and direction with respect to actual latitude and longitude coordinates (GIS and KML files associated with Google Earth). Such signals further correlate these measurements with the measurements and data collected by the vehicle-mounted high-definition visible and infrared band cameras.

Coupled with these components are one or more computer processors 6, 7 for digitally processing the measurements and video data signals collected by the vehicle-mounted high-definition visible and infrared band cameras. The computer processors have a high-speed processor and software for rapid integration (fast high speed frame rate) of video data signals collected by the vehicle-mounted high-definition visible and infrared band cameras. In communication with the processor(s) is a digital storage device whereby recorded data and signal outputs from the means described above are stored.

Also provided are digital proprietary software programs that process the recorded data and signal outputs and formats them for output and analysis.

Optionally available is at least one device such as a digital output monitor for displaying the output of the digital proprietary software such that the operator may readily visualize the internal structural condition of the material below the surfaces scanned. This allows the operator to identify and locate structural defects and features apart from those caused by superficial, visible band, or nonstructural defects of the scanned surfaces.

Preferably, the output format includes quantitative data related to the calculated percentage of structural defects and their respectively defined physical locations with respect to GPS standards in accordance with customer defined specifications, the transportation industry, and respective governing body standards.

The disclosed infrared and visible surface scanning and scoping apparatus, system, and method are adaptable to any commercially available highway vehicle, mobile equipment, drone, or the like for accurate and rapid collection of surface image data, processing, and analysis reporting.

One way to practice the disclosed techniques is to provide, not necessarily in the order listed:

a vehicle-mounted high-definition visible band camera 11;

a vehicle-mounted high-definition infrared band camera 12;

a structural boom assembly 4 attached to the vehicle whereby the high-definition visible and infrared cameras are remotely mounted at a desired separation distance between the surface to be scanned so as to encompass the desired field of view (FOV) (the FOV is preferably for example approximately at least one traffic lane in width or more as a portion of the roadway or bridge deck surface);

an electronic laser range finder 13 for accurately measuring the separation distance of the vehicle-mounted high-definition visible and infrared band cameras (the electronic laser range finder provides an accurate reference signal for calibration and correction factors related to the separation distance and data signals received by the vehicle-mounted high-definition visible and infrared band cameras);

at least one GPS antenna 24 for real-time recording of vehicle position, speed, and direction with respect to actual latitude and longitude coordinates (GIS and KLM files associated with Google Earth), further correlating these measurements to the measurements and data collected by the vehicle-mounted high-definition visible and infrared band cameras;

a computer 7 for digitally processing the measurements and video data signals collected by the vehicle-mounted high-definition visible and infrared band cameras. Optionally, the computer also runs software for rapid integration—fast high speed frame rate—of video data signals collected by the vehicle-mounted high-definition visible and infrared band cameras; and has (1) a digital storage device whereby recorded data and signal outputs from the means described above are stored; (2) digital proprietary software programs that further process the recorded data and signal outputs and formats the results for output and analysis; and (3) at least one digital output monitor that displays the output of the digital proprietary software so the operator may readily visualize the internal structural condition of the material below the surfaces previously scanned—this allows the operator to identify and locate structural defects and features apart from those cause by superficial, visible band, or non-structural defects of the scanned surfaces.

As described above, the output monitor (see, e.g. FIG. 4) may display defects or conditions of a surface near the vehicle. That is, the roadway or bridge traveled by the vehicle may be characterized and signalled to provide a driver, passenger, or autonomous vehicle with an ability to avoid the condition or slow the vehicle before impact. For example, a perimeter of the condition may be defined by one of the sensors or a combination thereof. The perimeter may be displayed, as stated above, on the output monitor. The perimeter may be associated with a particular lane in which the vehicle travels as defined by the FOV of the scanning apparatus. As such, all vehicles traveling on the same roadway in the same direction may receive different indications that a condition exists. That is, a vehicle in a left lane, may receive a wholly or partially different indication on the output monitor than a vehicle in the right lane. Such lane designations may be embodied in the KML data file specifically or determined by correlation with other data in the KML data file.

The sensors—alone or in part—may be used to determine whether, for example, a void or inclusion is causing all or a portion of the condition or defect. As such, only conditions that would otherwise cause an impediment to travel or otherwise suggest that the vehicle should slowdown or avoid the area may be displayed. For example, inclusions may identify potential roadway defects and not impede travel on the roadway. Inspection and transport vehicles may only be interested in conditions that are currently causing an impediment to travel, as suggested above. Therefore, only those roadway conditions may be displayed. That is, only voids or certain impediments may be displayed or used by the driver, passenger, or autonomy to guide the vehicle.

In association with the foregoing, the condition may only be displayed when it would actually affect the travel of the vehicle. That is, a longitudinal length of the perimeter of the condition defined by the sensors may be used to ensure only pertinent conditions are indicated. Similarly, the calculated percentage of structural defects may be used to ensure only pertinent conditions are indicated. A wheel radius 50 of the vehicle 3, as shown in FIG. 1, may be used to determine whether the condition is pertinent. For example, if a wheel radius substantially larger than the defects or conditions, the output monitor may ignore such conditions because they are not an impediment to the vehicle's travel. As such, a threshold ratio of the wheel radius and the longitudinal length of the condition may be used to determine whether the condition is to be displayed. Indeed, overcrowding of the output monitor may be reduced by only indicating conditions pertinent to the vehicle's travel.

The void or impediment may be otherwise characterized by a delamination of the travel surface. Indeed, an otherwise intact roadway may have voids that may be breached when subjected to a vehicle weight 60 or downforce above a calculated threshold. As such, the output monitor may provide indication that the weight of the vehicle exceeds a breach threshold of the condition and should be avoided. For example, a vehicle may have a measured or predetermined weight. The weight 60 may be distributed across a plurality of wheels. As such, each wheel carries a portion of the load 60 and exerts a downforce 60 on the travel surface. If such downforce 60 would cause a breach in the lamination, the output monitor may provide indication as such.

As detection techniques take time and money, contemporaneous information regarding the roadway may be unavailable. That is, information may be collected on an annual or biannual basis and become outdated. Therefore, predictive analysis (see, e.g. FIG. 5) may allow for the condition to be predicted such that an accurate indication of surface conditions is available whenever they are traversed. The predictive analysis may use a variety of factors. The predictive analysis may use traffic, for instance, the amount of traffic or weight of the traffic, to create a mathematical relationship, formula, or regressional relationship between the amount of time since the last data collection and the present day. The predictive analysis may individually and collectively analyze information from the sensors discussed above to predict the degradation. For example, the infrared sensor may be used as a better indication of the degradation due to the recognition of voids. Further, the multidimensional radar may improve the predictive analysis by detecting voids that would otherwise be obstructed from a vertically oriented sensor (e.g., in a case where the void lies below a section of Rebar). That is, the aggregation of void or inclusion information from all of the sensors may be used in the prediction analysis.

Figure 5:
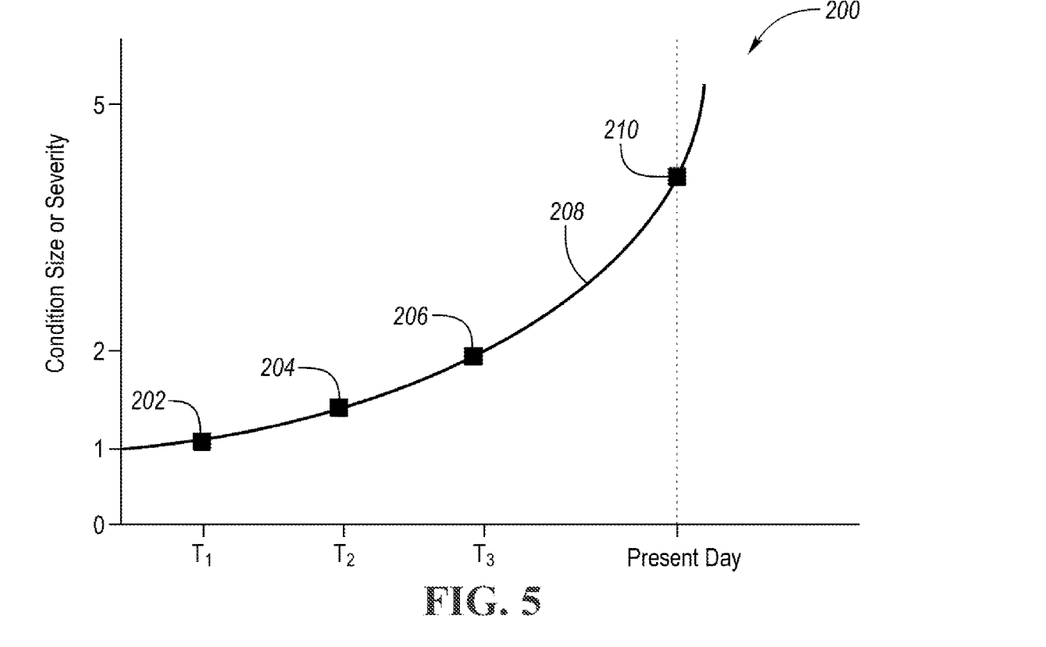
FIG. 5 is a graph indicating a predictive analysis of a road condition by size or severity.

The prediction analysis may compare previous analyses to create a mathematical relationship. The relationship may be linear, non-linear, exponential, or be otherwise categorically defined. The predictive analysis may extrapolate the gathered information, (e.g., void size) to determine whether the void would likely be open or breached at the later time of travel. The data correlation may further include the climate at the location of the surface. For example, climates having a freeze and thaw cycle may have roadways that deteriorate faster. Further, different locations may construct roads differently. Therefore, the construction of the roadway may be included in the predictive analysis. Indeed, many factors, including traffic, weight, climate, construction, and a period between the present data and the data collection may be used to predict the current condition after information is gathered. Further, an Arrhenius-type equation or implementation thereof may be used to predict or improve the prediction of surface degradation. For example, an Arrhenius-type equation may predict degradation of the roadway as a function of recorded temperatures near the roadway in a form similar to:

$$\ln(k) = \frac{E_{act}}{RT} + \ln(A), \quad (1)$$

where $E_{act}$ is the activation energy, R is the constant for ideal gasses, T is the temperature, and A is a constant wherein the natural log of the degradation of the roadway is equal to the reciprocal of the temperature plus a constant. Such degradation may be aggregated over time, such that $$\Sigma_i^n \ln(k) = \text{total degradation}, \quad (2)$$

that is, empirical data may be used to estimate the degradation of underlying binding agents (e.g., bitumen, Portland cement) or other materials that comprise the surface, substrate, or other structures, and thus predicting voids or other conditions that would impede travel.

Autonomous use of the condition data can be deployed. An autonomous vehicle may use the predicted conditions to avoid the affected areas or reduce speed prior to reaching the condition. For example, the autonomous vehicle may have a predefined speed threshold proportionately based on the depth of the condition. If the condition is determined to impede travel, the autonomous vehicle may calculate the proportionate speed required to traverse over the condition. If the proportionate speed cannot be obtained prior to traversing the condition, the vehicle 3 may attempt to avoid the condition. The autonomous vehicle 3 will determine whether other lanes are available for travel. If such a lane is available—i.e. a lane-change maneuver is available—then the vehicle 3 may review the condition of that lane or request the lane condition be sent before making the lane-change maneuver. If the other lane is conducive to unopposed travel, the lane change is performed.

If a lane change is unavailable or for other reasons, the autonomous vehicle 3 may attempt to avoid the condition while staying in the current lane. The autonomous vehicle 3 may determine if a path is unobstructed according to a wheel base of the vehicle. Indeed, an autonomous vehicle 3 may work from the edge of the present lane, finding a location for the left set of wheels to traverse the condition without imposition. When the first location is found, the autonomous vehicle 3 may check to see if the right set of wheels will similarly traverse the location unobstructed and continue checking until both sets of wheels can traverse around the condition in the same lane. Similarly, the check may be done instead with the right wheel first or from another starting location within the lane (e.g., the normal travel location of one of the sets of wheels within the current lane). If the check is performed from the normal travel location, an algorithm may check the nearest location on either side of the wheel first, then check the nearest location on the unchecked side before checking for clear passage farther from the normal travel location. Indeed, the path and speed of autonomous vehicles may be influenced by the existence of conditions or other components.

The conditions may be provided to a driver or passenger of the vehicle 3 having a mobile application installed on the occupant's nomadic device. For example, a mobile map application may provide the occupant with a similar indication of the conditions. The signals attained from the sensors may be sent in raw form to a cloud computing apparatus from a platform system 3. The signals may be culled to some extent to remove unnecessary information that would not affect vehicular travel. Additionally, a cloud computing apparatus 70 (FIG. 1) may receive the raw information. The information may be processed for conditions and predicted conditions and formatted in industry standard data files (e.g., KML data format). The information may then be sent to existing mobile map applications (e.g., Google Maps, Apple Maps, Waze). Indeed, such conditions can be indicated on any type of nomadic device possessed by occupants of the vehicle or by the vehicle itself.

The observing platform system may be situated in a drone. For example, the platform system may be a quadcopter drone. The sensors may be directly attached to a platform of the drone vehicle 3. The drone vehicle 3 may include rotatable, hinged, pivotable, or otherwise articulating propellers and, optionally, enable, the vehicle to direct the sensors at an angle with respect to the ground. The surface being scanned could be vertically or non-horizontally oriented (e.g., a building, railing, balcony, underside of bridge, wall). Similar scanning to that of a roadway surface may be performed regardless of the orientation of the surface to be scanned. Indeed, an entire structure may be scanned and documented to provide indication of voids or inclusions therein.

The data may be recorded in an additionally dimensioned KML file. The additionally dimensioned KML file could be similar to that of a standard KML file; although, for each two-dimensional location, indices for an orientation could be provided. For example, a square-column structural support of a roadway bridge may be scanned on four sides and data may be recorded according to one GPS location of the structural support (that includes latitude, longitude, and height) and the KML file would further include an orientation dimension for each of the four sides of the column such that voids and inclusions for each of the four sides of the column are indicated. As such, any degree of orientation may be recorded in the KML file to index the scanned information. Orientation may be determined by an additional sensor. For example, orientation may be determined by a compass, accelerometer, or a combination thereof.

Figure 4:
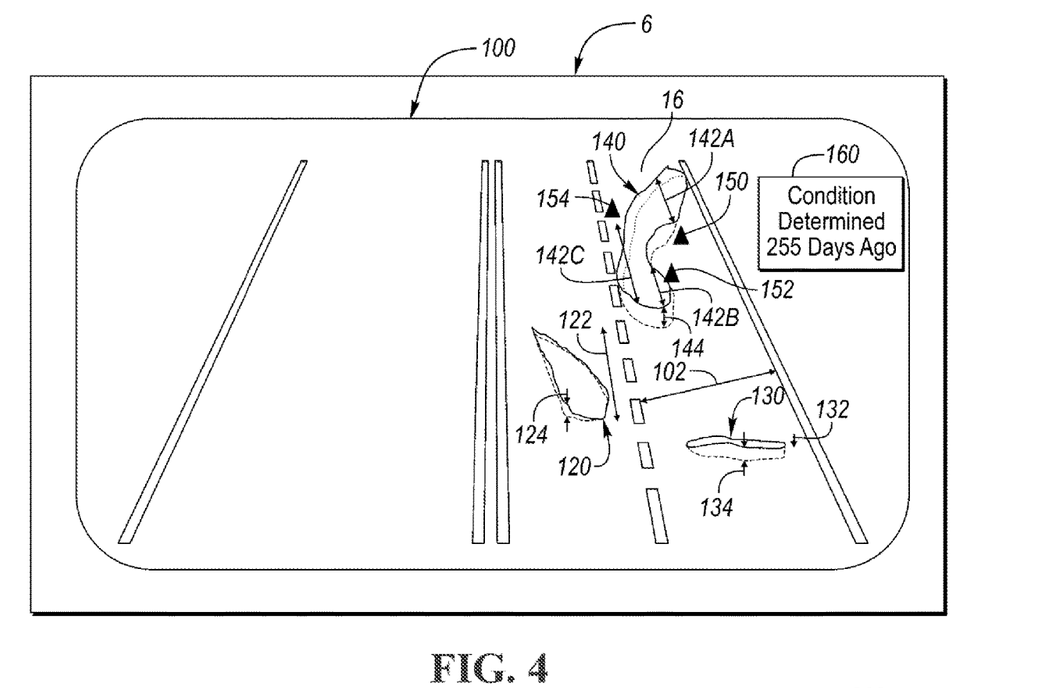
FIG. 4 is a representative output of the scanning and scoping head assembly.

Referring to FIG. 4, a representative display or computer monitor 6 is shown. The computer monitor 6 includes a display 100 for monitoring the output. The display 100 depicts a surface 16. The surface 16 may be a roadway, bridge, building, or other structure. The surface 16 may include a plurality of lanes. The lanes may be denoted by lane lines or other indicia. The display 100 may depict a plurality of defects or conditions 120, 130, 140. The conditions 120, 130, 140 may always be displayed when they are within a particular distance from the vehicle 3. If desired, the conditions 120, 130, 140 may be displayed only when the vehicle is headed in a direction that would raise the possibility of issue. For example, the GPS position of the vehicle 3 relative to the conditions 120, 130, 140 may control whether display occurs. Further, the direction of the vehicle 3 relative to the conditions 120, 130, 140 may further control whether the conditions 120, 130, 140 are displayed, such that only conditions 120, 130, 140 along a direction of travel are displayed and conditions 120, 130, 140 behind the vehicle 3 are not displayed.

Additionally, the display distance may be dependent on the direction of travel. That is, conditions 120, 130, 140 along the direction of travel may be displayed if they are within one mile of the vehicle 3, but conditions 120, 130, 140 behind the vehicle 3 may be displayed if they are within 20 feet of the vehicle. As such, importance can be placed on upcoming conditions 120, 130, 140 and conditions behind the vehicle are only displayed in anticipation of the vehicle 3 going in reverse.

As suggested, the display 100 may depict the conditions 120, 130, 140 on the screen as sensed by the inspection platform system or drone. The screen may also depict the conditions 120, 130, 140 via indicators 150, 152, 154. The indicators 150, 152, 154 may only be used to denote conditions that may be obstacles to the vehicle 3. For example, the condition 130 may have a depth 134 that could impede travel of the vehicle (e.g., causing excessive actuation of the suspension or damaging tires and wheels of the vehicle). The condition 130, however, may have a longitudinal length 132 that is less than a threshold proportionate to the radius 50 of the vehicle 3. Accordingly, the condition 130 is not anticipated to impede or otherwise impact the travel of the vehicle 3 because the wheel 52 is expected to roll over the condition. The wheel 52 movement may be impacted (e.g., causing actuation of shocks) but its effects may be marginally noticed by the vehicle occupants or not otherwise slow the vehicle. As such, the display 100 may not include indication for such a condition, as shown.

As an example, condition 120 may not be associated with an indication or displayed because the condition is not likely to impede travel. As shown, condition 120 has a longitudinal length 122—along the direction of travel of the surface—that would otherwise be likely to affect the wheel 52. The condition 120, however, does not have a depth 124 that would cause substantial actuation of the suspension above a predetermined amount or have a relationship with the radius 50 of the wheel 52 to impact travel. Indeed, conditions may be categorized via statistical or other methods to determine whether they will impact or otherwise impede the travel of a vehicle 3 based on a radius 50 of a wheel 52 of the vehicle.

On the other hand, the display 100 may depict a condition 140 that would impact the vehicle. As shown, condition 140 can be further segmented and analyzed by the computer 6. As such, particular longitudinal lengths 142A, 142B, 142C would likely impact the travel of the vehicle 3. As shown, each longitudinal length 142A, 142B, 142C is long enough to impede travel of the vehicle 3. The depth 144 of the condition 140 may be further segmented but is constant, as shown. In this case, the depth 144 of the condition 140 is greater than a proportional ration between the condition and a wheel 52 of the vehicle 3. As such, indicators associated with each section 142A, 142B, 142C and respective depths 144 are identified on the display 100. The actual contours of the condition may not be shown to avoid an overly complex graphical user interface. That is, only the indicators 150, 152, 154 corresponding to respective conditions 140 that would impede the vehicle 3 are shown. The indicators 150, 152, 154 may be shown as symbols and positioned according to actual GPS coordinates on the surface 16.

The GPS coordinates and associated conditions may be stored in the KML format. The KML format may include lane denotations from the FOV 17. The KML format may be augmented to reduce the data size of the KML data such that conditions having corresponding longitudinal lengths and depths greater than a predetermined threshold (e.g., smallest known vehicle wheel radius available for purchase in relevant countries) are stored and/or transmitted to the vehicle 3. As such, bandwidth, processing, and memory requirements of the computers 6, 7 are reduced in that only conditions impacting travel are transmitted, received, stored, and/or displayed. Further reduction may be provided by one of the computers 6, 7 in that only conditions pertinent to the particular vehicle 3 are transmitted, received, stored, and/or displayed.

It should be appreciated that the computers 6, 7 may be located onboard the vehicle, offboard the vehicle, or a combination thereof. That is, data reduction and analysis of conditions may (1) occur at the vehicle 3 during inspection and capture; (2) sent offboard from the vehicle 3 as raw data to be processed by cloud computers and the like; (3) received by a different vehicle as raw data to be further reduced before display, or (4) a combination thereof.

Indeed, separate stored parameters may exist based on use. A road condition company may require unreduced or minimally reduced data to ensure roadways are free from delamination or defects. A traveler or autonomous vehicle may only require a reduced condition file pertinent to the vehicle or conditions that may affect the vehicle.

It should be appreciated that any file format indicating locations and conditions may be used. Further, any computing style or language (e.g., C, C++, C#, Perl, Python) may be used to implement some or all of these teachings. Any processing structure or combination of processors and memory may be used to implement these teachings.

As such, this disclosure directly improves the use of computers, associated systems, and displays by reducing the necessary load for inspecting, recording, and/or displaying GPS coordinates associated with conditions that will impact a vehicle. The display further improves human factors associated with recognizing and mitigating conditions in real-time and at highway speeds at least because only conditions pertinent to the vehicle—or their indications—are displayed.

Referring to FIG. 5, a graph 200 is shown. The graph 200 includes data points 202, 204, 206 ($M_1$, $M_2$, $M_3$ respectively). Any number of data points may be used. The data points are taken at times $T_1$, $T_2$, $T_3$, respectively. $T_1$, $T_2$, $T_3$ may denote the measurements $M_1$, $M_2$, $M_3$ that were taken on an annual basis. As such, a mathematical relationship, formula, or regression 208 is determined. The relationship 208 may be linear, non-linear, categorical, or otherwise associate the data points 202, 204, 206 according to the time taken with the size and severity of the condition. Indeed, the present day size or severity of the condition 210 may be determined for each of the conditions 120, 130, 140 of FIG. 4. Such analysis may be performed by a cloud computer 70 or system accessible to or in the vehicle. Therefore, a prediction 210 of the size or severity of the condition may be included with or replace the conditions data received by the computer 6, 7. In some situations, this further improves the display 100 of information within the vehicle 3 because only relevant conditions predicted to impact the vehicle 3 may be communicated and/or displayed to the vehicle 3. The predictive analysis may further include the Arrhenius equation and the climate and traffic associated with the GPS coordinate.

Figure 6:
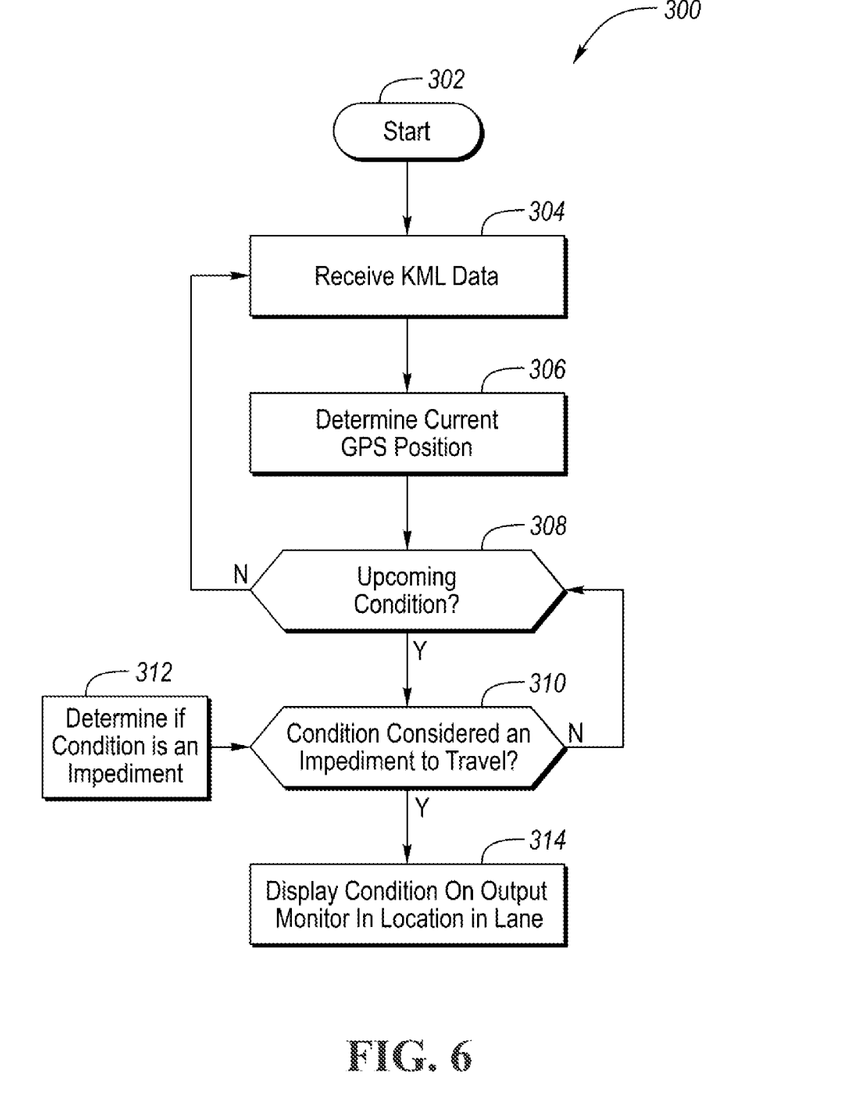
FIG. 6 is a representative algorithm of the present disclosure.

Referring to FIG. 6, an additional algorithm 300 is shown. The algorithm 300 starts in step 302. The algorithm 300 may run continuously or be initiated upon request. It should be appreciated that any or all of the steps may be omitted or rearranged. It should further be appreciated that any composition of processors and hardware may perform the steps in any location including the cloud 70 and the vehicle 3.

In step 304, the computer 6, 7 receives, for example, KML data. The KML data may come from the scanning assembly, the cloud 70, or another location. The KML data may be specific to the vehicle structure or specific to a location of the vehicle. In step 306, the vehicle receives the GPS position. The GPS position may be received from a GPS antenna, the scanning assembly, another component of the vehicle, or the cloud 70. The computer 6, 7 then determines whether the conditions sent in the data file are upcoming. This association can be determined via the distance between the condition and the vehicle 3. This association can also be determined by the direction of travel of the vehicle 3 and the condition. In step 310, the computer 6, 7 determines whether the condition is an impediment to travel as provided by sub-processes 312 defined in FIG. 7. If the condition is considered to be an impediment to travel in step 312, the computer 6, 7 will display the condition on the output monitor of the computer 6, 7. The condition may be associated with a lane the vehicle 3 is traveling in or be associated with a FOV the data was retrieved from. Such information may be provided in the KML data file or determined by the computer 6, 7 through a correlation of data within the KML data file.

Figure 7:
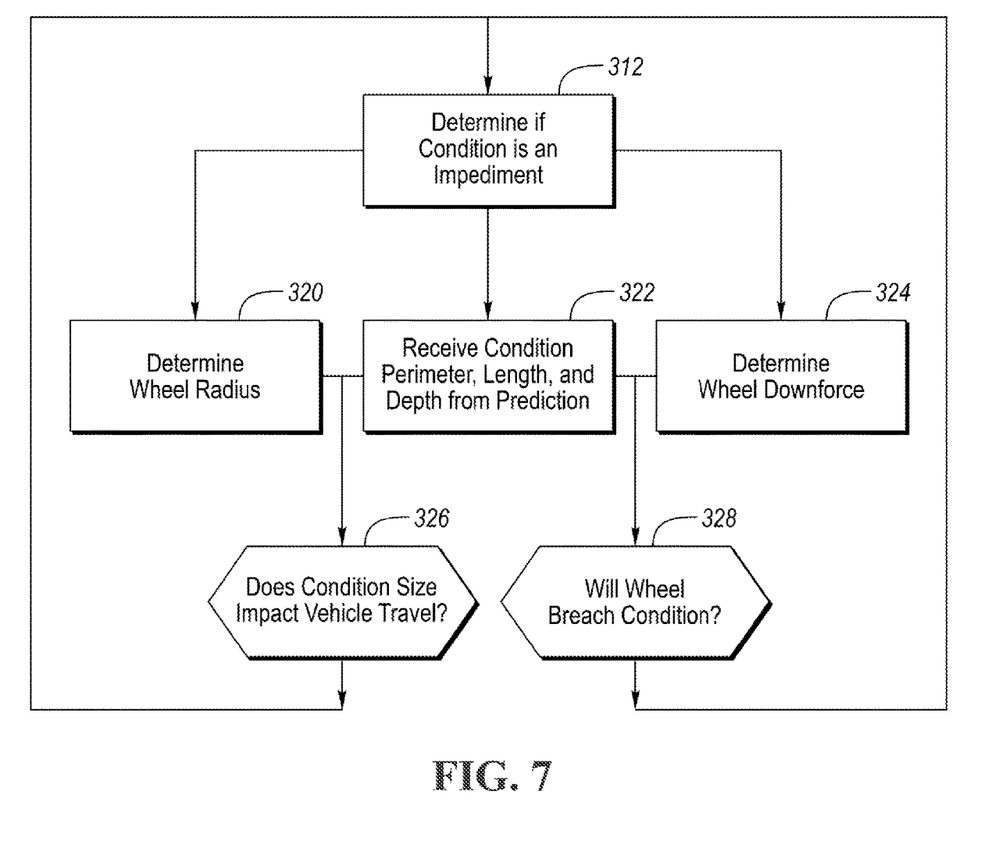
FIG. 7 is a representative sub-algorithm for the present disclosure.

Referring now to FIG. 7, a representative sub-algorithm 312 is shown. The sub-algorithm 312 may run continuously or be initiated upon request. It should be appreciated that any or all of the steps may be omitted or rearranged. It should further be appreciated that any composition of processors and hardware may perform the steps in any location including the cloud 70 and the vehicle 3.

In step 322, the vehicle 3 may determine the wheel radius 50. The wheel radius 50 may be retrieved from storage or be determined on the fly according to a variety of methods including the year, make, and model of the vehicle 3. The wheel radius 50 is used to determine a predetermined threshold relative to the size of the condition. Instead of calculating the predetermined threshold directly from the wheel radius 50, the predetermined threshold may be arbitrarily set or be associated with the vehicle make and model. In step 322 the condition, perimeter, length and depth of the predicted condition is received.

It should be appreciated that condition and predicted condition may be used synonymously or distinctly throughout this disclosure. In step 326, based on the condition perimeter, length, depth and other factors, the impact of the condition is determined with respect to the size of the wheel 52 and becomes an output of the sub-algorithm 312. Similarly, the wheel downforce is determined in step 324. If, based on a similar analysis of step 326, the wheel 52 is affected by the perimeter, length, and depth of the condition. In such a circumstance a void of the condition may be undetected by the naked eye if the lamination of the surface 16 is still intact. In such a situation, the wheel downforce, as calculated in step 324, is used to determine whether the wheel 52 will breach the lamination. Factors taken into account may include the thickness of the lamination and the density of the void. As such, the computer 6, 7 may determine whether a breach will be made and provide the result as an output to the sub-algorithm 312.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. It should also be appreciated that the list of reference numerals is provided entirely to assist the reader and should not be considered as limiting in any way.

LIST OF REF. NUMERALS

| Part Name | Reference Numeral |
| --- | --- |
| Head Assembly | 2 |
| Platform-based Observation System | 3 |
| Boom Assembly | 4 |
| Attachable Brackets | 5 |
| Computer And Monitor | 6 |
| Computer And Monitor | 7 |
| Signal Cable | 8 |
| Bracket Assembly | 9 |
| GPS Sensor Antenna | 10 |
| Visible Band Sensor | 11 |
| IR Sensor | 12 |
| Distance Measurement Sensor | 13 |
| Laser Beam | 14 |
| Target Area | 15 |
| Surface | 16 |
| FOV | 17 |
| Simultaneous Trigger | 22 |
| GPR Sensor | 23 |
| Global Positioning System Antenna | 24 |
| Wheel Radius | 50 |
| Wheel | 52 |
| Downforce | 60 |
| Cloud Computing Apparatus | 70 |
| Display | 100 |
| Condition | 120 |
| Longitudinal Length | 122 |
| Depth | 124 |
| Condition | 130 |

-continued

| Part Name | Reference Numeral |
|---|---|
| Longitudinal Length | 132 |
| Depth | 134 |
| Condition | 140 |
| Depth | 144 |
| Indicators | 150 |
| Indicators | 152 |
| Indicators | 154 |
| Graph | 200 |
| Data Points | 202 |
| Data Points | 204 |
| Data Points | 206 |
| Relationship | 208 |
| Prediction | 210 |
| Algorithm | 300 |
| Step | 302 |
| Step | 304 |
| Step | 306 |
| Step | 310 |
| Sub-Algorithm | 312 |
| Step | 312 |
| Representative Sub-Algorithm | 312 |
| Sub-Processes | 312 |
| Step | 322 |
| Step | 324 |
| Step | 326 |
| Longitudinal Length | 142A |
| Longitudinal Length | 142B |
| Longitudinal Length | 142C |

What is claimed is:

1. A platform-based observation system that is in communication with a substrate, the system being configured to identify a condition in, on, or within a structure, the platform system having components selected from the group consisting of:
inputs including one or more of
a visual scanning sensor including a visible band camera for capturing surface images of the structure to be evaluated,
an infrared scanning sensor including an infrared band camera for characterizing sub-surface conditions,
at least one GPS receiver that enables real-time recording of geographic position, speed, and direction of the platform system,
means for image collection from the visible band camera and the infrared band camera having a field of view (FOV), the FOV being preferably approximately at least one traffic lane width, and being further correlated with an elevation measuring sensor for measuring a distance of the visual scanning sensor and the infrared scanning sensor from the structure under observation, the elevation measuring sensor providing a reference signal indicative of the distance and data signals received by the visual scanning sensor and infrared scanning sensor;
processing, by a processor,
measurements and image collection data to define conditions according to the image collection and the geographic position such that conditions are defined within the FOV at the geographic position, and
conditions and organizing them according to file formatting associated with geographic information systems; and
outputs including one or more of
recording of the conditions on digital storage,
an output monitor configured to display conditions associated with the platform system.

2. The platform system of claim 1, wherein the output monitor further visualizes an internal structural condition of material below the surface, thus allowing an operator to identify and locate structural conditions and features apart from those representative of superficial, or nonstructural conditions of the surface, the condition being displayed according to a perimeter defined by the infrared scanning.

3. The platform system of claim 2, wherein a condition is displayed according to a maximum longitudinal length of the perimeter.

4. The platform system of claim 3, wherein the condition is displayed according to a relationship between the maximum longitudinal length of a condition and a wheel radius associated with the platform system.

5. The platform system of claim 2, wherein the correlated measurements and video signals further define the condition using ground-penetrating radar.

6. The platform system of claim 5, wherein the condition is displayed according to a void defined by the ground-penetrating radar.

7. The platform system of claim 6, wherein the void further defines a breach force of the condition and the breach force is displayed when a weight of a vehicle traveling across the substrate exceeds a breach threshold defined relative to the breach force.

8. The platform system of claim 2, wherein the condition is displayed according to a predicted condition of the substrate.

9. The platform system of claim 8, wherein the predicted condition is based on a relationship between the visual scanning sensor and the infrared scanning sensor.

10. The platform system of claim 9, wherein the relationship further includes data from ground penetrating radar.

11. The platform system of claim 10, wherein the relationship further includes data from one or more of the at least one GPS receiver.

12. The platform system of claim 11, wherein the predicted condition is further based on a climate associated with position sensed by a GPS receiver.

13. The platform system of claim 12, wherein the climate is limited to data associated with a period between a current date and an assessment date of the condition.

14. The platform system of claim 11, wherein the predicted condition is further based on traffic associated with the position from a GPS receiver.

15. The platform system of claim 14, wherein the predicted condition is further based on a predicted weight of traffic.

16. The platform system of claim 8, wherein the predicted condition is based on an algorithm that includes reaction rate dependence on temperature.

17. The platform system of claim 16, wherein the algorithm is an Arrhenius-type algorithm.

18. The platform system of claim 1, wherein the platform system includes a drone.

19. The platform system of claim 18, wherein the drone is autonomous.

20. The platform system of claim 18, wherein the drone is remote-controlled.

21. The platform system of claim 18, wherein the platform system is articulated such that its movement is influenced by a direction of the sensors of the inputs, thereby allowing the sensors to capture data associated with a non-horizontal surface.

22. A vehicle comprising:
- an output for displaying a condition of a structure associated with a platform-based observation system; and
- a processor configured, in response to measurements and video signals to define the condition such that a GPS receiver captures a position, speed, and direction of the platform-based observation system with respect to the condition that is synergized with image collection from a visual scanning sensor and an infrared scanning sensor that is further correlated with
  - an elevation measuring sensor including an electronic range finder for measuring a separation distance of the visual scanning sensor and the platform-based observation system,
  - the electronic range finder providing a reference signal for the correlation and correction factors related to separation distance and data signals received by the visual scanning sensor and infrared scanning sensor; and
  - means for displaying the condition on the output in accordance with a path of the vehicle.

23. The vehicle of claim 22, wherein the condition is displayed according to a perimeter defined by the infrared scanning sensor.

24. The vehicle of claim 23, wherein the condition is only displayed when a void is detected, as opposed to an inclusion.

25. The vehicle of claim 23, wherein the condition is displayed according to a maximum longitudinal length of the perimeter.

26. The vehicle of claim 24, wherein the condition is displayed according to a relationship between the maximum longitudinal length and a wheel radius of the vehicle.

27. The vehicle of claim 22, wherein the correlated measurements and video signals further define the condition using ground-penetrating radar.

28. The vehicle of claim 27, wherein the condition is displayed according to a void defined by the ground-penetrating radar.

29. The vehicle of claim 28, wherein the void further defines a breach force of the condition and the breach force is displayed when a weight of the vehicle exceeds a breach threshold defined relative to the breach force.

30. The vehicle of claim 22, wherein the condition is displayed according to a predicted condition of the structure.

31. The vehicle of claim 30, wherein the predicted condition is based on a relationship between the visual scanning sensor, and the infrared sensor.

32. The vehicle of claim 31, wherein the relationship further includes ground penetrating radar.

33. The vehicle of claim 31, wherein the relationship further includes the GPS receiver.

34. The vehicle of claim 30, wherein the predicted condition is further based on a climate associated with the position from the GPS receiver.

35. The vehicle of claim 34, wherein the climate is limited to data associated with a period between a current date and an assessment date of the condition.

36. The vehicle of claim 30, wherein the predicted condition is further based on traffic associated with the position from the GPS receiver.

37. The vehicle of claim 36, wherein the predicted condition is further based on a predicted weight of the traffic.

38. The vehicle of claim 30, wherein the predicted condition is based on an algorithm that includes an Arrhenius equation.

39. A method for characterizing a substrate, the method comprising:
- receiving data related to conditions associated with a geographical position of a substrate near an observation vehicle according to claim 22; and
- energizing a processor configured to, in response to one or more conditions lying on the substrate in a path of the vehicle and being a positive impediment to travel based on a radius of a wheel of the observation vehicle and a longitudinal length of the one or more conditions, displaying one or more characteristics of a condition on an output monitor according to geographical position of the condition with respect to the geographical position of the substrate.

40. The method of claim 39, wherein the conditions are identified by a correlation of an image collection from a visual scanning sensor and an infrared scanning sensor having a similar field of view (FOV), further correlated with observations of an elevation measuring sensor including a range finder for measuring separation distance of the visual scanning sensor from a structure, the electronic range finder providing a reference signal for the correlation and correction factors related to the distance and data signals received by the visual scanning sensor and infrared scanning sensor, and displaying the condition on the output in accordance with a path of the vehicle.

41. The method of claim 39, wherein the condition is predicted based on a climate associated with the geographical position.

42. The method of claim 39, wherein the condition is predicted based on traffic associated with the geographical position.

43. The method of claim 39, further including the steps of
- reporting out or sending the outputs of the processor to a cloud-based computing system; and
- delivering from the cloud-based computing system data indicative of a predicted condition to an app, the app being selected from the group consisting of Google Earth, Google Maps, Waze, a vehicle-based infotainment system app, and the like.

44. The vehicle of claim 22, further including one or more heads for delivering a paint spray for automatic marking of the structure so that at least some defects are identified, wherein location information is tracked by the GPS receiver and stored in the processor.

45. The vehicle of claim 44, wherein the processor communicates with the GPS receiver and the one or more heads for delivering a paint spray so that as the vehicle drives along, it can mark defective areas, thereby dispensing with a need to mark manually.

46. A vehicle comprising:
- an output for displaying a condition of a structure associated with a platform-based observation system; and
- a computer system for directing display to the output in reaction to quantitative data related to structural conditions at defined physical locations of the platform-based observation system with respect to GPS coordinates of the structural conditions apart from those caused by superficial conditions
- wherein observations of the conditions are correlated according to an image collection from a visual scanning sensor and infrared scanning sensor having a similar field of view (FOV), and being further correlated with data from an elevation measuring sensor including a range finder for measuring a separation distance of the visual scanning sensor above the structure, the electronic range finder providing a reference signal for correlation and correction factors related to height and data signals received by the visual scanning sensor and infrared scanning sensor, and displaying characteristics of the conditions on the output in accordance with a path of the vehicle.

\* \* \* \* \*